(12) United States Patent
Stange

(10) Patent No.: US 7,467,557 B2
(45) Date of Patent: Dec. 23, 2008

(54) METHOD FOR MEASURING THE FLOW RATE OF A MEDIUM

(75) Inventor: Gerd Stange, Nortorf (DE)

(73) Assignee: Zylum Beteiligungsgesellschaft mbH & Co. Patente II KG, Schönefeld/Waltersdorf (DE)

( * ) Notice: Subject to any disclaimer, the term of this patent is extended or adjusted under 35 U.S.C. 154(b) by 0 days.

(21) Appl. No.: 12/046,725

(22) Filed: Mar. 12, 2008

(65) Prior Publication Data

US 2008/0184811 A1    Aug. 7, 2008

Related U.S. Application Data

(63) Continuation of application No. PCT/DE2006/001565, filed on Sep. 5, 2006.

(30) Foreign Application Priority Data

Sep. 13, 2005    (DE) .................. 10 2005 043 718

(51) Int. Cl.
  *G01F 1/56*    (2006.01)
  *G01F 1/58*    (2006.01)
(52) U.S. Cl. .................. 73/861.08; 73/861.12
(58) Field of Classification Search .. 73/861.08–861.15
  See application file for complete search history.

(56) References Cited

U.S. PATENT DOCUMENTS

| | | | | |
|---|---|---|---|---|
| 4,118,981 A | * | 10/1978 | Cave | .................. 73/861.13 |
| 4,344,331 A | * | 8/1982 | Iwasaki | .................. 73/861.76 |
| 4,817,448 A | * | 4/1989 | Hargarten et al. | ........ 73/861.356 |
| 5,060,526 A | * | 10/1991 | Barth et al. | .............. 73/862.59 |
| 5,388,455 A | * | 2/1995 | Hamby et al. | ............. 73/152.29 |
| 5,837,885 A | * | 11/1998 | Goodbread et al. | ......... 73/32 A |
| 2004/0154409 A1 | * | 8/2004 | Stange | .................... 73/861.12 |

FOREIGN PATENT DOCUMENTS

| | | |
|---|---|---|
| DE | 2 027 947 A | 12/1971 |
| DE | 2 229 703 A | 1/1973 |
| DE | 2 401 641 A | 7/1974 |
| DE | 198 43 808 A1 | 3/2000 |
| DE | 199 22 311 C2 | 6/2001 |
| DE | 102 21 677 C1 | 4/2003 |
| JP | 01178822 A | 7/1989 |

OTHER PUBLICATIONS

Tewodros Amare, "Design of an electromagnetic flowmeter for insulating liquids", Meas. Sci. Technol., vol. 10, pp. 755-758, Jun. 1999.

* cited by examiner

*Primary Examiner*—Harshad Patel
(74) *Attorney, Agent, or Firm*—Panitch Schwarze Belisario & Nadel LLP

(57) ABSTRACT

A method is provided for measuring the flow rate of a medium in a volume subjected to a magnetic field. The electrical resistance of a semiconductor arranged adjacent to the volume is measured, and the flow rate of the medium is computed from this electrical resistance.

11 Claims, 1 Drawing Sheet

METHOD FOR MEASURING THE FLOW RATE OF A MEDIUM

CROSS-REFERENCE TO RELATED APPLICATION

This application is a continuation of International Patent Application PCT/DE2006/001565, filed Sep. 5, 2006, published in the German language on Mar. 22, 2007 under International Publication No. 2007/031053 A2, the disclosure of which is incorporated herein by reference.

BACKGROUND OF THE INVENTION

The invention relates to a method for measuring the flow rate of a medium in a volume permeated by a magnetic field, wherein an electric field is induced in the medium by its flowing motion. More particularly, the invention relates to signal decoupling in a magnetic-inductive flow rate sensor (MID).

Most of the magnetic-inductive flowmeters or flow rate sensors available on the market today operate with galvanic signal decoupling and require a minimum electrical conductivity of the medium. Measuring the induced voltage here, in practice, amounts to a current measurement, which becomes more difficult the greater the internal resistance of the medium. In addition, this type of coupling requires a time variable magnetic field, in order to eliminate disruptive electro-chemical potentials on the metallic, conductive electrodes.

The systems available on the market with capacitive signal decoupling, which is advantageous for many reasons, also cannot eliminate a minimum conductivity, because in the end a current measurement is also performed in these systems. In contrast to galvanically coupled systems, for basic reasons, a time variable magnetic field is necessary in these systems to generate a continuous, alternating current flow.

An alternative is presented, however, in German Patent DE 102 21 677 C1, in which the time variable magnetic field is replaced by time variable coupling capacitors. This opens up the possibility of using permanent magnets and thus reducing to zero the considerable power requirements for generating a magnetic alternating field. However, this alternative—just like the systems described above—is subject to a minimum conductivity of the medium, because here the current generated by the variable capacitors is also measured.

Another solution approach for using the magnetic-inductive measurement method with non-conductive media is described in German published patent application DE 198 43 808 A1, in that there the induced voltage is not used directly as a measurement parameter, but instead the resulting dielectric polarization charge is used. Indeed, here no minimum conductivity of the medium is required. However, in the end this method also depends on measurement of the displacement current caused by the time variable polarization charge. Due to the small magnitude of this polarization charge, realization of this measurement is difficult.

Furthermore, the prior art includes the arrangement described in German Patent DE 199 22 311 C2 for determining three-dimensional rate distributions in electrically conductive liquids, the device shown in the Japanese laid-open publication JP 01-178822 A for measuring the flow rate with a semiconductor device, the electrode arrangement shown in German published patent application DE 2 401 641 A1 for an electromagnetic flowmeter, and devices described in the article by Tewodros Amare, "Design of an electromagnetic flowmeter for insulating liquids," *Meas. Sci. Technol.* 10:755-758 (1999).

Up to the last-cited reference of T. Amare, the corresponding prior art methods, without exception, are only successful with the help of a current measurement, which requires a minimum conductivity of the medium in practical measurement systems available today. Therefore, existing systems are limited to the use of aqueous media.

The last-cited reference of T. Amare assumes that the resistance, or current flow, between each electrode and a screening electrode is measured for determining its capacitance. Here, the magnetic field frequency and the field set electrostatically are difficult to control.

BRIEF SUMMARY OF THE INVENTION

An object of the invention is to create a method for capacitive signal decoupling in the magnetic-inductive flow measurement, which overcomes the mentioned disadvantages of the methods known today associated with required current flow. A capacitive measurement method, which uses the effects of the induced electric field directly, without depending on the current flow in the medium, would be desirable.

Now, from electrochemistry it is known that significant practical advances have been made recently in no-power (electrostatic) detection of electrochemical signals. Thus, electrodes with integrated field-effect transistors for measuring electrochemical parameters (e.g., pH value measurement) of liquid media are commercially available today. These advances give reason to detect electrical signals generated not only due to electrochemical reasons but also due to physical reasons.

The above objects of the invention are achieved by a method for measuring the flow rate of a medium in a volume permeated by a magnetic field, wherein the electrical resistance of a semiconductor arranged adjacent to the volume is measured, and wherein the flow rate of the medium is determined by computation from this electrical resistance.

According to an embodiment of the invention, for measuring the flow rate of a medium in a volume permeated by a magnetic field, there is provided at least one semiconductor with controllable conductive properties on the boundary face of the volume, which is acted upon by the electric field induced in the medium by its flowing motion in interaction with the magnetic field, so that its charge carrier concentrations are influenced ideally only by this electric field, i.e., with no current and therefore no power. From the consequent change in resistance, the induced electric field strength is determined and from this the flow rate of the medium can be calculated.

It is known that the nearly no-power control of the conductivity properties of semiconductors can best be achieved with field-effect transistors (FET). Using the assumption of an especially simple arrangement, which is here only an example for describing the method according to the invention, such a FET is formed in the volume boundary face of the medium, so that its gate is in direct contact with the medium only via an insulating layer located on the gate. Here, the insulating layer should exhibit the smallest possible dielectric constant, in order to minimize the screening of the induced field.

The electric field induced by the flowing motion of the medium has a capacitive effect via the gate insulator on the conduction channel of the FET and changes its resistance, which can be measured across the source-drain connections.

From this change in resistance, first the induced electric field strength can be determined and from this the flow rate can be calculated.

In the sense of the method according to the invention it is to be emphasized, in particular, that the change in resistance of the semiconductor channel described in this exemplary arrangement is realized through a purely electric field effect without a current flow, so that a control without power is given.

The advantages of the measurement of the induced electric field strength associated with such no-current control of the semiconductor resistance according to the method of the invention are obvious: by eliminating the requirement for a minimum conductivity of the medium, the method is still appropriate for use with a minimum conductivity, but is additionally suitable for very weakly conductive and even non-conductive media. Preferably, the medium is non-conductive and can be polarized electrically.

In an especially preferred embodiment, the method is performed with permanent magnets. In this case, which entails the presence of a constant flow rate, nearly all of the methods with capacitive signal decoupling, based on the prior art, fail in the measurement of a stationary state, because they require a change in the electric field, which occurs only for a change in the flow rate. Only the method of German Patent DE 102 21 677 C1 is designed for permanent magnets. However, the measurement signal there is detected as a current in the forced change of the coupling capacitors, which brings along a constant recharging of the capacitors. This leads simultaneously to constant charge shifts in the medium by virtue of electrical induction. Therefore, a clear measurement signal is to be expected only with sufficient conductivity of the medium.

The capacitive methods according to the prior art perform work on the medium, in order to determine its flow state. In contrast, the measurement method according to the invention is distinguished precisely by its ability to detect a stationary state of the total measurement system, in that an adjustment of the charge carrier density in the semiconductor by the electric field to be measured is used for the measurement according to the method, and this adjustment follows the change in flow rate, and thus the change in this field, with practically no delay.

The method according to the invention generates, in principle, no—targeted—change in the electric or magnetic field, which is to be detected by the medium. During the measurement, no work is performed on the medium.

Another advantage lies in the completely galvanic decoupling between the measurement section in the medium and the conduction channel of the semiconductor. The output signal obtained via the conduction channel can be linked flexibly to the requirements of an external evaluation circuit due to the associated impedance decoupling and can be transported without loss of information across greater conduction lengths. Accordingly, in one embodiment an electrical measurement circuit defined by a variable resistance of at least one semiconductor is decoupled galvanically from a measurement section in the medium, and the electrical measurement circuit is used for adapting an impedance to an external measurement and evaluation circuit.

According to a preferred embodiment of the invention, at least two semiconductors are arranged on essentially opposite, paired positions of a wall of a tube section defining the medium volume, such that a connecting line between the two semiconductors lies perpendicular to a direction of flow of the medium and essentially perpendicular to a direction of the magnetic field. Substrates of the at least two opposing semiconductors are preferably set to the same electric potential.

It is further preferred to arrange an insulating layer, which stops charge transfer between the medium and the at least one semiconductor, between the at least one semiconductor and the medium. The insulating layer should have a dielectric constant as small as possible.

According to a particularly preferred embodiment, at least one semiconductor comprises a gate electrode of a field-effect transistor (FET), and the FET is arranged on at least one boundary face of the medium volume. More preferably, at least two FETs are arranged on essentially opposite, paired positions of a wall of a tube section forming the volume, and substrates of the at least two opposing FETs are set to the same electric potential.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
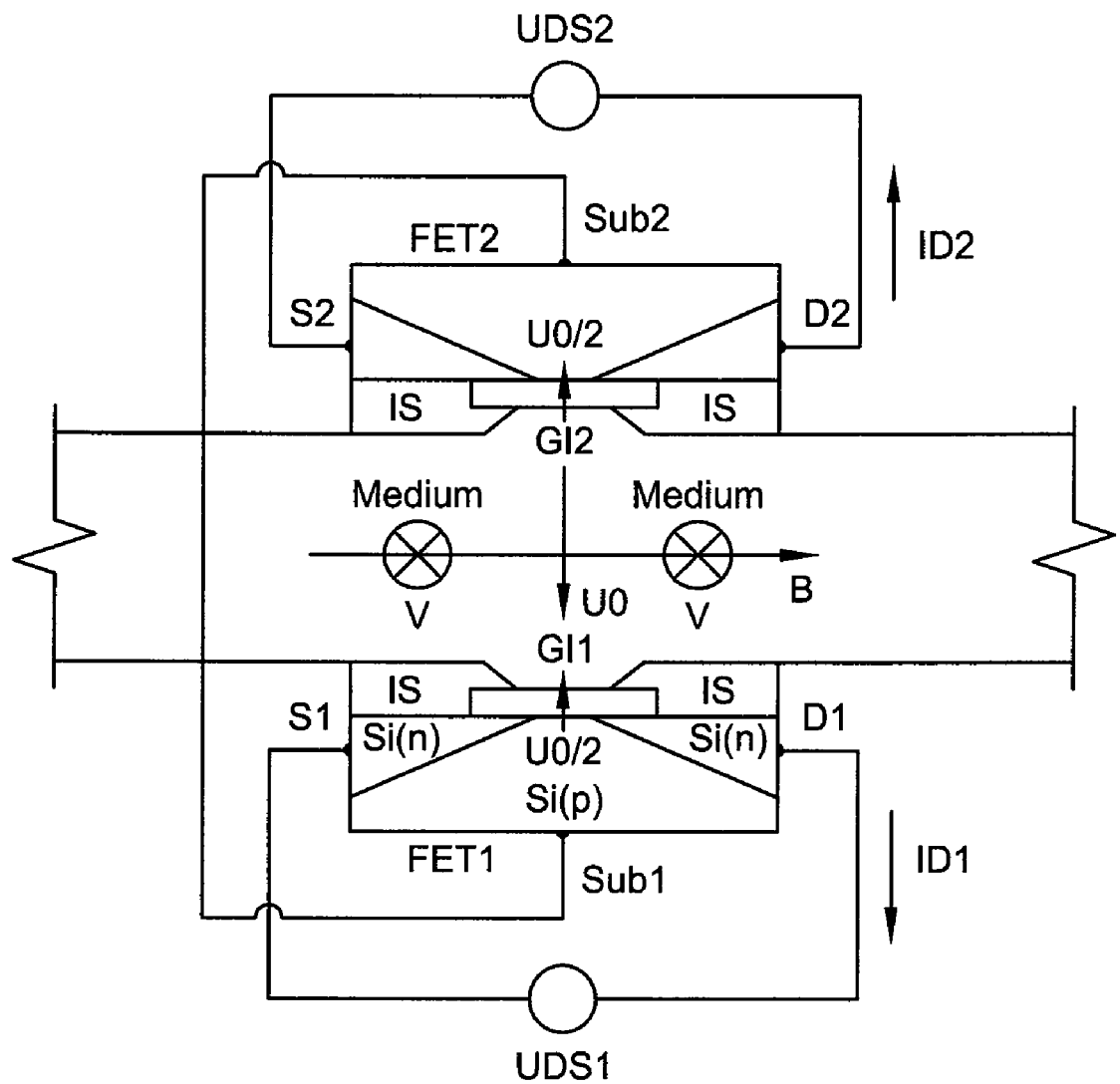
FIG. 1 is a schematic, cross-sectional view of an arrangement for carrying out a method according to one embodiment of the invention.

FIG. 1 shows a schematic cross section of a possible arrangement for carrying out an embodiment of a method according to the invention, having two FETs (FET1, FET2, shown greatly exaggerated in their size) of the same type lying opposite each other with the medium to be measured located in-between. The source S1, S2 and drain D1, D2 contacts are connected to the voltage sources UDS1 and UDS2, respectively, so that the drain currents ID1 and ID2, respectively, flow. The source and drain areas are separated from the medium by insulating layers IS. The induced voltage U0, which arises due to the interaction of the medium flowing at a rate v with the magnetic field of induction B, is divided in half to form the gate voltages on the gate insulators GI1 and GI2 of the FETs due to the connection of the substrate connections Sub1 and Sub2. In this embodiment, it is clearly seen that the gate voltages, top and bottom, have different polarities relative to the corresponding FETs, so that they lead to opposing changes in the drain currents, whose difference is a measure for the voltage U0 and consequently for the rate v.

As mentioned above, the arrangement shown in FIG. 1 represents merely one embodiment. Depending on the type of semiconductor structure that is used, the properties of the medium, the type of magnetic field—time constant or variable, and depending on the type of measurement task—current or flow measurement, a large number of measurement arrangements according to the method of the invention is conceivable, so that a flexible adaptation to the practical requirements is guaranteed.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A method for measuring a flow rate of a medium in a volume permeated by a magnetic field, the method comprising measuring an electrical resistance of at least one semiconductor arranged adjacent to the volume, and computing the flow rate of the medium from the electrical resistance.

2. The method according to claim 1, wherein the volume is an interior of a tube section and the at least one semiconductor is arranged on a wall of the tube section.

3. The method according to claim 2, wherein at least two semiconductors are arranged on essentially opposite, paired positions of the wall of the tube section, such that a connecting line between the two semiconductors lies perpendicular to a direction of flow of the medium and essentially perpendicular to a direction of the magnetic field.

4. The method according to claim 3, wherein substrates of the at least two opposing semiconductors are set to a same electric potential.

5. The method according to claim 1, wherein the medium is non-conductive and is electrically polarizable.

6. The method according to claim 1, wherein an insulating layer, which stops charge transfer between the medium and the at least one semiconductor, is arranged between the at least one semiconductor and the medium.

7. The method according to claim 6, wherein the insulating layer has a dielectric constant as small as possible.

8. The method according to claim 1, wherein the magnetic field is generated by a permanent magnet.

9. The method according to claim 1, wherein the at least one semiconductor comprises a gate electrode of a field-effect transistor (FET), wherein the FET is arranged on at least one boundary face of the volume.

10. The method according to claim 9, wherein at least two FETs are arranged on essentially opposite, paired positions of a wall of a tube section forming the volume, and substrates of the at least two opposing FETs are set to a same electric potential.

11. The method according to claim 1, wherein an electrical measurement circuit defined by a variable resistance of the at least one semiconductor is decoupled galvanically from a measurement section in the medium, and the electrical measurement circuit is used for adapting an impedance to an external measurement and evaluation circuit.

* * * * *